(12) United States Patent
Ash et al.

(10) Patent No.: US 6,281,326 B1
(45) Date of Patent: *Aug. 28, 2001

(54) PROCESS FOR PREPARING POLY (ARYLENE SULFIDE) POLYMERS USING WASTE MATERIAL

(75) Inventors: Carlton E. Ash; Jon F. Geibel, both of Bartlesville, OK (US)

(73) Assignee: Phillips Petroleum Company, Bartlesville, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/120,305

(22) Filed: Sep. 13, 1993

Related U.S. Application Data (63) Continuation of application No. 07/719,852, filed on Jun. 24, 1991, now abandoned.

(51) Int. Cl.[7] ................................................. C08G 75/14
(52) U.S. Cl. ................................. 528/388; 525/537
(58) Field of Search ............................... 528/388; 525/537

(56) References Cited

U.S. PATENT DOCUMENTS

| 3,354,129 | 11/1967 | Edmonds, Jr. et al. | 260/79 |
|---|---|---|---|
| 3,607,843 | 9/1971 | Vidaurri, Jr. | 260/79 R |
| 3,919,177 | 11/1975 | Campbell | 260/79.1 |
| 4,405,767 | 9/1983 | Beever et al. | 525/537 |
| 4,415,729 | 11/1983 | Scoggins et al. | 528/388 |
| 4,645,826 | 2/1987 | Iizuka et al. | 528/388 |
| 4,730,034 * | 3/1988 | Nesheinat et al. | 528/388 |

FOREIGN PATENT DOCUMENTS

0409105A2    1/1991    (EP) .

* cited by examiner

*Primary Examiner*—Helen L. Pezzuto
(74) *Attorney, Agent, or Firm*—Polly C. Owen

(57) ABSTRACT

A process is provided for producing a poly(arylene sulfide) polymer which employs waste material comprising poly (arylene sulfide) polymer that is normally discarded or otherwise disposed of, wherein the waste stream is contacted with a polymerization reaction mixture under polymerization conditions. The waste material can optionally contain other components such as cyclic and linear oligomers, inorganic salts, polar organic compounds and water.

20 Claims, 4 Drawing Sheets

PROCESS FOR PREPARING POLY (ARYLENE SULFIDE) POLYMERS USING WASTE MATERIAL

CROSS-REFERENCE TO RELATED APPLICATION

This application is a Continuation of prior application, Ser. No. 07/719,852, filed Jun. 24, 1991, now abandoned.

FIELD OF THE INVENTION

This invention relates to poly(arylene sulfide), (PAS) polymers. In one aspect this invention relates to a process for the preparation of poly(arylene sulfide) polymers wherein waste material is used as a reactant in the polymerization.

In one embodiment of this invention, the waste material is obtained as an undesired by-product of a previous poly (arylene sulfide) polymerization. In another embodiment, the waste material is obtained as an undesired product during the purification of a previously prepared poly(arylene sulfide) polymer. In yet another embodiment, the waste material is previously prepared poly(arylene sulfide) polymer obtained from commercial production which is not within the specifications for the desired product. In yet another embodiment, the waste material is poly(arylene sulfide) material that has been sufficiently contaminated during preparation and/or recovery so that it is unacceptable for its originally intended use.

BACKGROUND OF THE INVENTION

Poly(arylene sulfide) polymers are generally known in the art and have been found useful due to their high chemical and thermal resistance. Processes for the preparation of such poly(arylene sulfide) polymers have been disclosed in the art. In a typical preparation, at least one dihaloaromatic compound, a sulfur source, and a polar organic compound are contacted under polymerization conditions. Often certain molecular weight enhancing agents are also added during the polymerization. At the termination of the polymerization, the desirable product is recovered from the polar organic compound, unconsumed reactants and by-product inorganic salts and any water which may be present. Some recovery processes for poly(arylene sulfide) polymers additionally separate desirable higher molecular weight product from the less desirable low molecular weight poly(arylene sulfide) and cyclic and linear oligomers. Occasionally, a recovered poly(arylene sulfide) polymer is subjected to a purification process to remove lower molecular weight portions, oligomers and other impurities from the more desirable higher molecular weight portions.

During commercial production, poly(arylene sulfide) polymer is occasionally produced which is not within the specifications for the desired product. During preparation and/or recovery, polymer product can become contaminated by coming into contact with compounds which are not intended to be a part of the particular product.

In all of the above-mentioned situations, undesired materials must be disposed of in some manner, for example, by placing such material in a landfill or blending such material with other product to render it usable. It would be economically and environmentally desirable to have a process using at least a portion of such undesirable or waste materials so that some of the material need not be disposed of.

OBJECTS OF THE INVENTION

It is an object of this invention to provide a process for preparing a poly(arylene sulfide) polymer which employs poly(arylene sulfide) polymer waste material.

SUMMARY OF THE INVENTION

In accordance with this invention, poly(arylene sulfide) polymers are prepared by contacting a polymerization reaction mixture comprising at least one dihaloaromatic compound, a sulfur source, and a polar organic compound with a poly(arylene sulfide) waste material under polymerization conditions.

In accordance with one embodiment of this invention, the waste material comprises relatively low molecular weight poly(arylene sulfide) polymer when compared to the poly (arylene sulfide) polymer prepared by the invention process.

In accordance with other embodiments of this invention, the waste material comprises poly(arylene sulfide) polymer of equal or higher molecular weight than the poly(arylene sulfide) polymer prepared by the invention process.

This invention provides a method whereby material that is ordinarily discarded or otherwise disposed of can be used in subsequent polymerizations to produce desirable polymer.

DETAILED DESCRIPTION OF THE INVENTION

The poly(arylene sulfide) polymer is prepared according to this invention by contacting a polymerization reaction mixture comprising at least one dihaloaromatic compound, a sulfur source, and a polar organic compound with poly (arylene sulfide) waste material under polymerization conditions.

Dihaloaromatic compounds which can be employed in the process of this invention can be represented by the formula sulfide is used as a hydrate or as an aqueous mixture. If desired, the alkali metal sulfide can be prepared as an aqueous solution by the reaction of an alkali metal hydroxide with an alkali metal bisulfide in aqueous solution. It is preferred to use sodium sulfide or a combination of sodium bisulfide and sodium hydroxide as the sulfur source in this invention.

The polar organic compounds useful in the present invention are solvents for the dihaloaromatic compounds and the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, 1,3-dimethyl-2-imidazolidinone, low molecular weight polyamides, and the like. The polar organic compound presently preferred is NMP.

It is within the scope of this invention to employ other components in the polymerization reaction mixture or during the polymerization. For example, molecular weight modifying or enhancing agents such as alkali metal carboxylates, lithium halides, or water can be added or produced during polymerization. Suitable alkali metal carboxylates which can be employed include those having the formula R' CO$_2$M where R' is a hydrocarbyl radical selected from alkyl, cycloalkyl, aryl, alkylaryl, arylalkyl, and the number of carbon atoms in R' is in the range of 1 to about 20, and M is an alkali metal selected from lithium, sodium, potassium, rubidium and cesium. The alkali metal carboxylate can be employed as a hydrate or as a solution or dispersion in water. The preferred alkali metal carboxylate is sodium acetate due to availability and effectiveness.

In one embodiment of this invention, the poly(arylene sulfide) waste material which is contacted with the polymerization reaction mixture according to this invention generally comprises relatively low molecular weight poly (arylene sulfide) polymer as compared to the poly(arylene sulfide) polymer prepared by the invention process.

In a second embodiment of this invention, the poly (arylene sulfide) waste material which is employed in the invention process comprises poly(arylene sulfide) polymer of equal or higher molecular weight than the poly(arylene sulfide) polymer prepared using the waste material.

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of suitable p-dihalobenzenes include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene. 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromo-benzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dicblorobenzene, 1-octyl-4-(3-methylcyclopentyl)-2,5-dichloro-benzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Alkali metal sulfides which can be employed in the process of this invention include lithium sulfide, sodium sulfide, potassium sulfide, rubidium sulfide, cesium sulfide, and mixtures thereof. Preferably, the alkali metal The waste material can also contain of other components such as, for example, cyclic and linear oligomers, polar organic compound, dihaloaromatic compounds and tri- or tetra-haloaromatic compounds, inorganic salts, poly(arylene sulfide) polymerization by-products, and various contaminants introduced during a poly(arylene sulfide) polymerization or recovery.

The waste material can be obtained as undesired material (by-product) during the recovery of useful and desired poly(arylene sulfide) polymer following the termination of a poly(arylene sulfide) polymerization. Poly(arylene sulfide) polymerizations are generally disclosed in the art. For example, U.S. Pat. No. 3,354,129, which is hereby incorporated by reference, U.S. Pat. No. 3,919,177, and U.S. Pat. No. 4,645,826 all disclose methods of preparing poly (arylene sulfide) polymers. The above-cited patent publications also disclose methods for recovering a useful poly (arylene sulfide) polymer product. Another suitable method of recovering poly(arylene sulfide) polymer products is disclosed in U.S. Pat. No. 4,415,729, which is hereby incorporated by reference.

In accordance with this disclosure a method is provided for recovering granular poly(arylene sulfide) from a polymerization reaction mixture, at a temperature above that at which poly(arylene sulfide) is in molten phase, comprising polar organic solvent, alkali metal halide by-product and poly(arylene sulfide). In this method, the temperature of the polymerization reaction mixture is reduced sufficiently to produce a slurry comprising particulate poly(arylene sulfide) in polar organic solvent while the reaction mixture is in the presence of an amount of a liquid soluble in the polar organic solvent but not itself a solvent for poly(arylene sulfide), preferably water, sufficient to cause a phase separation of molten poly(arylene sulfide) from the polar organic solvent.

This water quench technique can also be stated as a method for recovering granular poly(arylene sulfide) from a polymerization reaction mixture, at a temperature above that at which poly(arylene sulfide) is in molten phase, containing polar organic solvent, alkali metal halide by-product and poly(arylene sulfide) in which the polymerization reaction mixture is contacted with an amount of a liquid soluble in the polar organic solvent but not itself a solvent for poly(arylene sulfide), preferably water, sufficient to cause phase separation of molten poly(arylene sulfide) from polar organic solvent with subsequent reduction of the temperature of the separated phases to a degree sufficient to produce a slurry of particulate poly(arylene sulfide) in polar organic solvent.

In accordance with further embodiments of this technique the reaction mixture, after the production of the slurry of particulate poly(arylene sulfide) in polar organic solvent, is subjected to further treatments to separate and recover arylene sulfide polymer particles and to separate and recover or dispose of the other components of the reaction mixture.

The process of this technique is suitable for use in recovering poly(arylene sulfide) produced by any method that results in a reaction mixture containing a molten poly(arylene sulfide), polar organic solvent, various impurities, and unreacted reactants. The most common of impurities will be by-product alkali metal halide—principally sodium chloride (NaCl)—and poly(arylene sulfide) oligomers which are gelatinous materials commonly described as "slime" because of their physical properties.

This water quench technique can thus be described as a method for recovery of granular poly(arylene sulfide) from a polymerization reaction mixture comprising polar organic solvent, poly(arylene sulfide) and alkali metal halide by-product said reaction mixture at a temperature above that at which poly(arylene sulfide) is in molten phase said method comprising, in the presence of a sufficient amount of a separation agent that is soluble in said polar organic solvent and is not a solvent for poly(arylene sulfide) to cause a phase separation of said molten poly(arylene sulfide) from said polar organic solvent, reducing the temperature of said polymerization reaction mixture sufficiently to produce from said polymerization reaction mixture a slurry comprising particulate poly(arylene sulfide) in polar organic solvent. These patent publications all describe the separation of a desired polymer product from reaction mixtures containing various impurities and unreacted polymerization components.

Another method of producing poly(arylene sulfide) waste material is by separating the waste material from a desired product in a process to purify an already prepared and recovered poly(arylene sulfide) polymer. The waste material obtained from a purification of previously prepared poly(arylene sulfide) can contain relatively low molecular weight poly(arylene sulfide) polymers, cyclic and linear oligomers, inorganic salts and water.

Another way of obtaining poly(arylene sulfide) waste material is as recovered polymer product from a commercial production run which is determined to be outside the desired specifications for sellable product. This material can be otherwise acceptable polymer of either relatively low or high molecular weight and can be prepared by any method known to those of ordinary skill in the art, such as those previously referenced.

Poly(arylene sulfide) waste material can also be obtained as otherwise acceptable polymer product which was contaminated during production or recovery by coming into contact with materials which were not meant to be in that particular product. Contamination can occur, for example, by contacting the polymer with dirty equipment or surfaces in the production facility.

The poly(arylene sulfide) polymer prepared by the invention method can be either high or low molecular weight polymer. When describing the polymer prepared by the invention method, the term low molecular weight poly(arylene arylene sulfide) polymer is generally meant to denote a poly(arylene sulfide) polymer having a melt flow value in the range of greater than 1000 g/10 min. to about 30,000 g/10 min. when measured according to ASTM D 1238, Condition 316/5.

The term high molecular weight poly(arylene sulfide) polymer, as used herein, is generally meant to denote an essentially linear poly(arylene sulfide) polymer having a melt flow value less than about 1000 g/10 min when in an uncured state. Essentially linear poly(arylene sulfide), as used herein, is defined as a polymer having no branching or such a small amount of branching as to have substantially no effect on the polymer properties. For example, the amount of polyhaloaromatic impurity found in the dihaloaromatic used in the poly(arylene sulfide) polymerization process would not be sufficient to cause the resultant poly(arylene sulfide) to be outside the essentially linear definition).

One component that can be present in the poly(arylene sulfide) waste material is poly(arylene sulfide) polymer which is of relatively lower molecular weight than the polymer prepared by the invention method. The term relatively lower molecular weight poly(arylene sulfide) polymer, used herein to refer to the waste material, is meant to denote that the poly(arylene sulfide) polymer contained in the waste material is of lower molecular weight than the molecular weight of the desired poly(arylene sulfide) product resulting from the invention polymerization process. Any poly(arylene sulfide) polymer portion which is of lower molecular weight than the desired product can be used, however it is envisioned that the relatively lower molecular weight poly(arylene sulfide) polymer in the waste stream would have a low enough molecular weight that its inclusion in the desired product from which it was separated would detrimentally effect the desired product's properties. In this manner, the economics of the invention method's operation are optimized. Generally, the relatively lower molecular weight poly(arylene sulfide) polymer which is separated out as undesirable will have extrusion rates and melt flow rates which are at least 50% greater than those of the desired product from which it was separated, when measured according to ASTM D 1238, condition 316/0.345 and Condition 316/5, respectively.

The waste material can contain poly(arylene sulfide) polymer having the same or a higher molecular weight than the polymer prepared by the invention method.

Other components that can be present in the waste material can be cyclic and/or linear oligomers. Such cyclic oligomers will generally have the formula, where $4 \leq n \leq 15$.

Linear oligomers contained in the waste material will generally have the formula, where X and Y are end-groups occurring as by-products of the polymerization. End groups that will typically be present are hydrogen atoms, halogen atoms, thiols and the salts thereof, phenoxy groups, hydroxyls and the salts thereof, cyclic amides groups and substituted and unsubstituted amines of the formula, where $R_1$ and $R_2$ are selected from hydrogen, alkyl groups having 1–10 carbon atoms and carboxylic acids having from 1 to 10 carbon atoms and the salts thereof.

The waste material can optionally contain other components such as unreacted polymerization reactants and polymerization modifiers. For example, alkali metal carboxylates can be used as polymerization modifiers as disclosed in U.S. Pat. No. 3,919,177, and can therefore be present in the waste material. Lithium halides can also be used as modifiers and can therefore be present in the waste material. The waste material may also contain some amount of water, which was added during polymerization as a modifier or with the other reactants, produced during the polymerization reaction, or added during recovery of the polymer.

The waste material can contain otherwise acceptable poly(arylene sulfide) polymer which was contaminated during polymerization and/or recovery. It should be noted that the waste material which is used in this invention should not contain components which might act as polymerization chain terminating agents during polymerization. For example, the waste material should not contain significant amounts of thiophenol.

It is within the scope of this invention to utilize waste material that has had one or more components removed by various methods such as, for example, distillation, solvent extraction, and filtration.

Generally, the ratio of reactants employed in the polymerization process can vary widely. It is preferred that the molar ratio of the amount of dihaloaromatic compound to amount of sulfur source be in the range of about 0.8/1 to about 2/1. If an alkali metal carboxylate is employed as a molecular weight modifying agent, it is preferred that the molar ratio of alkali metal carboxylate to dihaloaromatic compound be within the range of about 0.05/1 to about 4/1.

The amount of polar organic compound employed can vary during the polymerization over a wide range. Preferably, however, during polymerization the molar ratio of the amount of polar organic compound to the range of sulfur source is in the range of 1/1 to 10/1.

The amount of waste material which is contacted with the polymerization reaction mixture can vary widely. Generally, the upper limit on the amount of waste material employed will be imposed by the various limitations of the process vessels such as volume or solids handling limitations.

It is noted that if the waste material contains dihaloaromatic compound or other components used in the polymerization reaction mixture, the amount of waste material should be limited in combination with the components of the reaction mixture so that the general guidelines regarding relative amounts of reactants set forth above are followed. The waste material can contain amounts of certain reactants so that it is not necessary to add any additional amount of that particular reactant to the polymerization mixture. It is also noted that if higher molecular weight poly(arylene sulfide) waste material is added to poly(arylene sulfide) polymerization, it is preferred that the amount added not exceed that amount necessary to cause liquid-liquid phase separation of the polymerization mixture, so that the invention process produces polymer having the originally intended molecular weight.

The components of the reaction mixture can be contacted with each other in any order. Generally, the waste material can be contacted with the components of the polymerization reaction mixture at any time prior to or during polymerization. If the waste material contains a significant amount of water, it is preferred that the waste material be contacted with the sulfur source and polar organic compound under conditions sufficient to remove at least a portion of the water prior to addition of the dihaloaromatic compound and commencement of the polymerization; or in the alternative, it is preferred that the waste material be added at a later point during the polymerization so that the addition of the waste material containing water does not adversely affect the polymerization. If the waste material containing water is to be added after commencement of the polymerization, it is preferred that at least 40% conversion of the dihaloaromatic monomer has taken place prior to the addition.

The waste material is preferably contacted with the polymerization reaction mixture during a time sufficiently prior to termination of the polymerization in order to allow reaction of the waste material with the polymerization reaction mixture. It is therefore presently preferred to contact the waste material with the polymerization reaction mixture at least 30 minutes prior to termination of the polymerization.

The term commencement of the polymerization as used herein is defined as that point at which the polymerization reaction mixture is first subjected to polymerization conditions sufficient to initiate polymerization. The term termination of polymerization, as used herein, is defined as that point at which an affirmative step is taken to effect a removal of the conditions necessary for polymerization to effectively continue, for example, by beginning the recovery of the poly(arylene sulfide) polymer from the polymerization mixture. It must be noted that use of the term termination of the polymerization does not imply that complete reaction of the polymerization reaction components has occurred. It should also be noted that, as used herein, the term termination of the polymerization is not meant to imply that no further polymerization of the reactants can take place. Generally, for economic reasons, poly(arylene sulfide) polymer recovery is typically begun at a time when polymerization is substantially completed, that is, the increase in polymer molecular weight which would result from further polymerization is not significant enough to warrant the additional polymerization time.

Although the reaction temperature at which the polymerization is conducted can vary over a wide range, generally it will be within the range of about 170° C. (347° F.) to about 325° C. (617° F.), preferably about 200° C. to about 290° C. The reaction time can vary widely, depending in part on the reaction temperature, but generally will be within the range of about 10 minutes to about 72 hours, preferably about 1 hour to about 8 hours. The pressure should be sufficient to maintain the polar organic compound and the dihaloaromatic compound substantially in the liquid phase.

The poly(arylene sulfide) polymer prepared according to this invention can be recovered by any method known to those of ordinary skill in the art. It is within the scope of this invention to obtain poly(arylene sulfide) waste material for use in subsequent polymerizations during the recovery of desired poly(arylene sulfide) polymer prepared according to this invention. In this manner, a portion of the waste material resulting from the manufacture of poly(arylene sulfide) polymer can continuously be reused in subsequent polymerizations, avoiding the necessity of disposing of at least a portion of such waste material.

The following examples are provided in order to further illustrate the invention, but are not intended to be limiting of the scope thereof.

EXAMPLES

In the following examples, the polymer extrusion rates, reported as grams per 10 minutes (g/10 min), were determined by the method of ASTM D 1238, Condition 316/0.345. The orifice used for measuring the extrusion rate had a 2.096+/−0.005 mm diameter and a 31.75+/−0.05 mm length. Polymer melt flow values, in units of g/10 min, were determined by the method of ASTM D 1238, Condition 316/5. The orifice used for measuring the melt flow had a 2.096+/−0.005 mm diameter and a 8.000+/−0.025 mm length.

Poly(phenylene sulfide) (PPS) molecular weight determinations were done on a specially constructed high temperature gel permeation chromatography (GPC) instrument with a flame ionization detector. GPC analyses were carried out at 220° C. in 1-chloronaphthalene. Results are reported in terms of the weight average molecular weight (Mw). Molecular weight values are based on polystyrene standards. For purposes of characterization of molecular weight distribution, the quantity of lower molecular weight material found in the samples have been described herein in terms of the weight percent in the 100 to 10,000 g/mol range.

Several of the examples below utilize fine particle sized waste material of different types in PPS polymerizations. While the waste material employed in the following example has been described in terms of "fines" or "fine particle sized" material, it should be recognized that the poly(arylene sulfide) waste material employed in the invention process can be in any form or phase which can be added to the polymerization mixture. For convenience, it is preferred to add the waste material containing poly(arylene sulfide) polymer in the solid phase, either in the form of fine particles or in a slurry where the polymer particles are dispersed in a liquid comprising a polar organic compound.

Example I

This example describes the general preparation of a poly(p-phenylene sulfide) polymer, (PPS), according to the method disclosed in U.S. Pat. No. 3,919,177, and the separation of crude polymerization product into a granular, higher molecular weight product and a finer particle sized, lower molecular weight product. In this typical PPS preparation, a mixture of aqueous sodium bisulfide (NaSH) (419.8 moles), 428.2 moles aqueous sodium hydroxide (NaOH), a portion of the total 1400 moles of N-methyl-2-pyrrolidone (NMP), and 127.3 moles aqueous sodium acetate (NaOAc) in a stirred reactor were heated and a portion of the water was removed in a dehydration step.

After the dehydration step, 426.4 moles p-dichlorobenzene (DCB) and remaining portion of the 1400 moles of NMP were added to the dehydrated mixture and the total mixture was heated to polymerization conditions (265.6° C.) to produce PPS. At the conclusion of the polymerization, the reactor was cooled to about 93° C. to produce a mixture of a granular PPS and a finer particle sized material dispersed in a liquid. Then 393 moles of NMP were added to the reactor mixture in order to facilitate its removal from the reactor.

The crude reactor product was filtered on a coarse filter (120 mesh screen) to remove the granular PPS product. An additional 983 moles of NMP was added to the reactor and was then used to rinse the solid PPS on the coarse filter. The filtrate, a mixture of fine solids and liquid comprising, salts (primarily NaOAc and NaCl), NMP (including NMP rinse), DCB, water, and by-products, is referred to herein as the "crude filtrate". When the crude filtrate was filtered on a fine filter to separate the solid particles and the solid particles were washed with a solvent, such as hot water, to remove residual salts, then dried at 60° C. in a vacuum oven; the filtered, washed, and dried solid poly(arylene sulfide) material is referred to herein as the "washed PPS fines".

Example II

This example describes the effect of adding PPS fines obtained from a PPS polymerization and recovery to-another PPS polymerization. Control PPS polymerization Run 1 was carried out in a one-liter, stirred autoclave. The autoclave was charged with 1.0 g-mol NaSH as an aqueous mixture containing 73.4 weight percent NaSH, 1.02 g-mol NaOH, and 2.00 g-mol NMP. After the autoclave had been flushed with nitrogen, the stirred autoclave was heated and dehydration was carried out.

Following dehydration, 1.03 g-mol of DCB and 1.00 g-mol NMP were charged to the dehydrated mixture and the reactor was heated to 235° C. and held for one hour. The reactor was then heated to 265° C. and held for two hours. Then, the reactor was cooled and opened. The product mixture was a gray dry appearing cake. The product was washed with distilled water 8 times at temperatures of 80–90° C., then filtered to recover a polymer product. Approximately 106 g of PPS with an extrusion rate of 34.7 g/10 min was obtained after drying.

Invention Run 2 was carried out using the procedure described for Run 1, except that approximately 5 g of washed PPS fines A from a sodium acetate-modified PPS polymerization were added to the reactor after the DCB charge. Washed PPS fines A had a Mw of 38000 g/mol and 29.0 weight percent in the lower molecular weight range between 100 and 10,000 g/mol. A comparison of the products from Runs 1 and 2 is shown in Table I. Both products have essentially the same extrusion rate, Mw, and level of low molecular weight material. The addition of the washed PPS fines in polymerization 2 gave an increase in product yield without increasing the amount of low molecular weight PPS compared with Run 1.

TABLE I

PBS Polymerizations

| Run | Washed PPS Fines A Wt, g | Added | Extrusion Rate, g/10 min | PPS Product g | Mw, g/mol | Low M/W,[a] wt % |
|---|---|---|---|---|---|---|
| 1 | None, Control | — | 34.7 | 106 | 25,600 | 24.1 |
| 2 | 5 | After DCB Charge | 34.9 | 109.1 | 26,800 | 22.9 |

[a]Weight % of material having a molecular weight between 100 and 10,000 g/mol.

Example III

Figure 1:
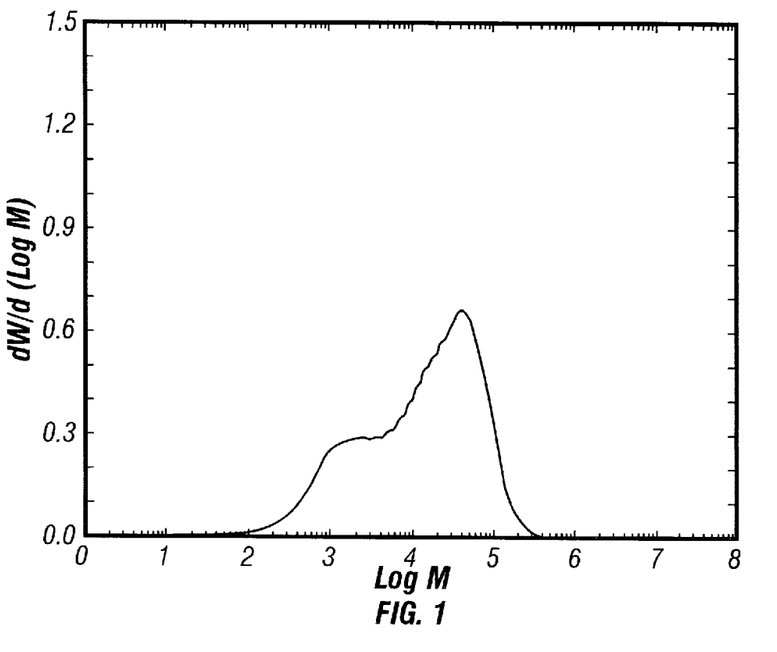
FIG. 1 depicts a molecular weight distribution measured by gel permeation chromatography (GPC) for a poly(arylene sulfide) waste material.

Several PPS polymerization runs were carried out to demonstrate the effect of adding various levels of washed fines and the effect of adding fines at different times during the polymerization. Washed PPS fines B was prepared from another PPS crude filtrate using the same procedure as described in Example I. Washed PPS fines B had a Mw of 31,100 g/mol and had 37.9 weight percent between 100 and 10,000 g/mol. The GPC distribution of washed PPS fines B is shown in FIG. 1.

PPS polymerization Runs 3 and 4 were control runs without added fines. These runs were done in a manner similar to the procedure for Run 1 in Example II except for the use of three hours at 265° C. instead of two hours. All polymerizations in these examples used three hours at 265° C., except for Runs 1 and 2.

Invention Runs 5, 6, and 7 involved the addition of three different levels of washed PPS fines B immediately after the NMP-DCB charge. In Run 5, 1.01 g-mol of DCB in 0.75 g-mol NMP was charged to the dehydrated mixture, followed by 5.4 g of washed PPS fines B in 0.25 g-mol NMP and a rinse with 10 g of NMP. Some of the fines remained in the charging cylinder; these fines were recovered and weighed and found to weight 0.6 g, so the amount of fines actually added to the polymerization was calculated to be 4.8 g.

In Run 6, 1.01 g-mol of DCB in 0.50 g-mol NMP was charged to the dehydrated mixture, followed by 10.8 g of washed PPS fines B in 0.50 g-mol NMP and a rinse of 20 g of NMP. The amount of washed PPS fines actually added to the polymerization was 10.32 g. In Run 7, the DCB in 0.25 g-mol of NMP was charged to the dehydrated mixture, followed by 27.0 g of washed PPS fines B in 0.75 g-mol NMP and a rinse of 0.5 g-mol of NMP. The amount of washed PPS fines actually charged to the polymerization was calculated to be 22.83 g.

Invention Runs 8 and 9 added washed PPS fines B at later times during the polymerization. In Run 8, 1.01 g-mol of DCB in 0.75 g-mol NMP was charged to the reactor after dehydration and after one hour at 235° C., 5.4 g of washed fines B in 0.25 g-mol NMP was charged to the mixture with a rinse with 10 g of NMP. It was calculated that 4.66 g of the fines was actually added. In Run 9, 1.01 g-mol of DCB in 0.75 g-mol NMP was charged to the dehydrated mixture and after one hour of the total of three hours at 265° C., 5.4 g of washed fines B in 0.025 g-mol NMP was charged to the mixture with a rinse of 10 g NMP. It was calculated that 5.06 g of the PPS fines was actually added to the polymerization.

The runs from this example are summarized in Table II. The addition of increasing amounts of fines to the PPS polymerization in Runs 5, 6, and 7 results in increased levels of isolated polymer, compared with control Runs 3 and 4, with essentially the same extrusion rates and molecular weight values. Adding the washed PPS fines later in the polymerization in Runs 8 and 9 resulted in an increase in levels of isolated polymer, compared with control Runs 3 and 4, with no significant change in extrusion rates and molecular weights.

TABLE II

PPS Polymerizations

| Run | Washed PPS Fines B g | Added | Extrusion Rate, g/10 min | PPS Product g | Mw, g/mol | Low MW,[a] wt % |
|---|---|---|---|---|---|---|
| 3 | None | Control | 18.4 | 103.5 | 29,100 | 19.9 |
| 4 | None | Control | 10.2 | 100.9 | 32,400 | 16.1 |
| 5 | 4.8 | After DCB | 18.7 | 105.9 | 30,700 | 17.9 |
| 6 | 10.32 | After DCB | 17.1 | 111 | 30,800 | 17.0 |
| 7 | 22.83 | After DCB | 16.9 | 122.8 | 29,000 | 17.4 |
| 8 | 4.66 | After 235° C. | 16.4 | 104.8 | 31,800 | 16.1 |
| 9 | 5.06 | After one hour at 265° C. | 10.7 | 106 | 31,100 | 18.2 |

[a]Weight % of material having a molecular weight between 100 and 10,000 g/mol.

Figure 2:
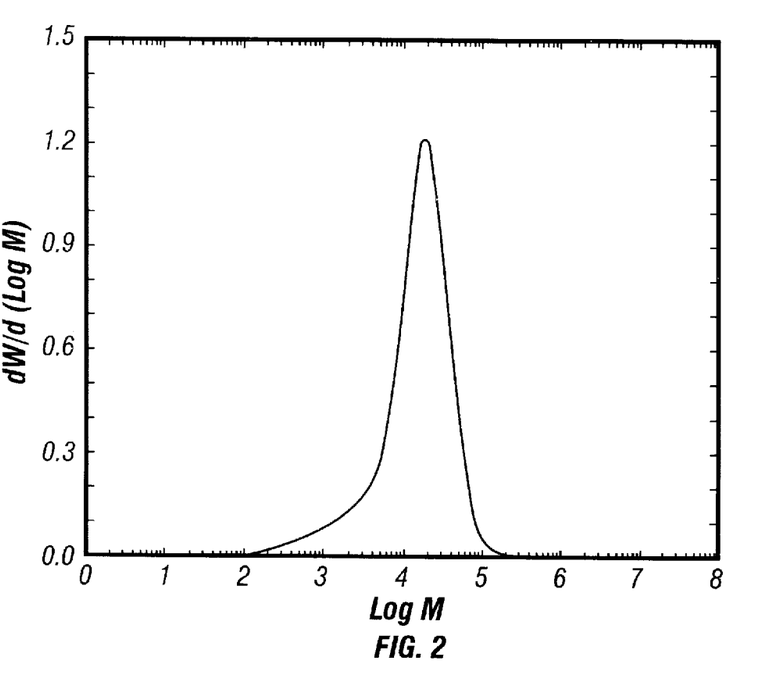
FIG. 2 depicts the GPC molecular weight distribution of a poly(arylene sulfide) polymer prepared by conventional methods.
Figure 3:
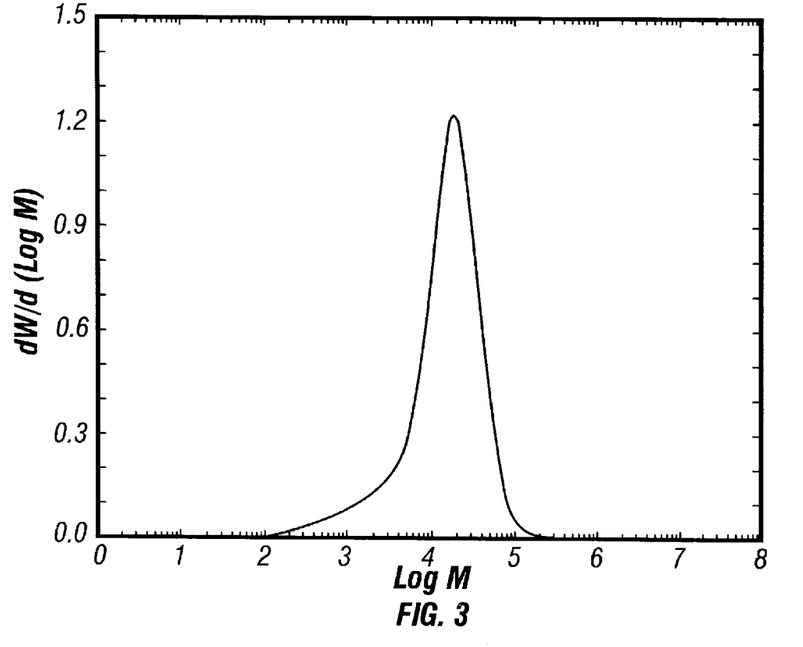
FIG. 3 depicts the GPC molecular weight distribution of a poly(arylene sulfide) polymer prepared according to the invention method.
Figure 4:
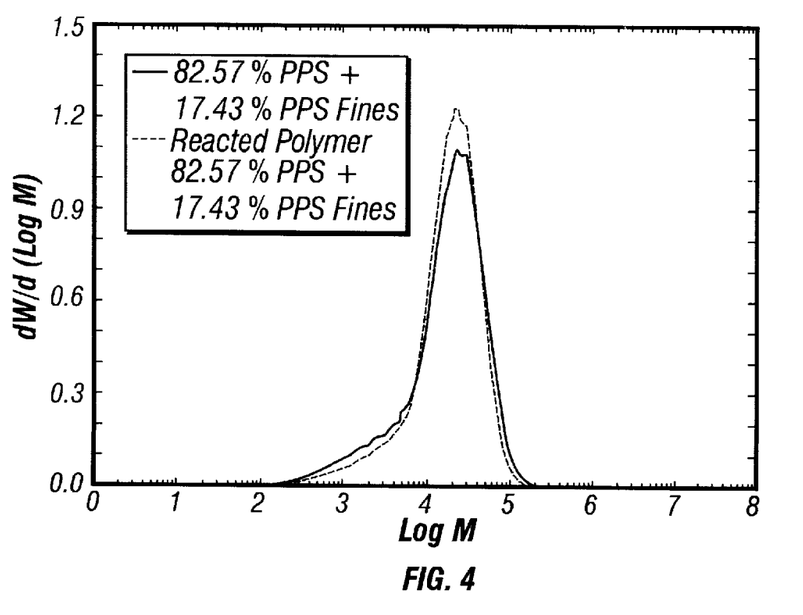
FIG. 4 depicts a comparison of a theoretical GPC molecular weight distribution prepared by mathematically combining the GPC distributions of a poly(arylene sulfide) polymer and a poly(arylene sulfide) waste material with a measured GPC molecular weight distribution for a polymer prepared according to the invention.

GPC molecular weight distributions of the control polymer from Run 3 (FIG. 2) and of the invention polymer from Run 6 (FIG. 3) are essentially the same. A comparison of the calculated molecular weight distribution of a simple mixture of the identical amount of washed PPS fines B and a control PPS polymer with the molecular weight distribution experimentally measured for Polymer 7 (FIG. 4) shows that Polymer 7 has less low molecular weight material than predicted from the simple addition.

Example IV

Figure 5:
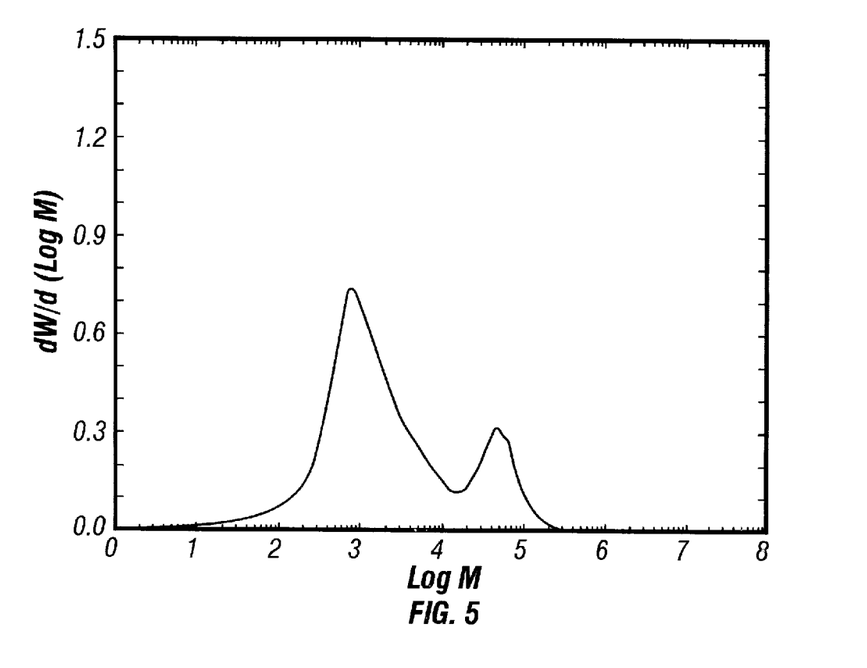
FIGS. 5 and 6 depict the GPC molecular weight distributions of poly(arylene sulfide) polymer waste materials that were washed to remove certain components.

This example demonstrates the addition of a concentrated filtrate recovered from a PPS polymerization to another PPS polymerization. The concentrated filtrate C was prepared by placing a crude filtrate slurry on a filter to remove a portion of the liquid. The concentrated filtrate C thus comprised NMP, water, NaCl, NaOAc, DCB, PPS and minor amounts of other polymerization by-products. From analyses of both the original filtrate slurry and the concentrate by filtering a small portion, washing with hot water, (approximately 80° C.) and drying in a vacuum oven, the poly(arylene sulfide) fines were found to comprise 1.27 weight percent in the original slurry and 2.6 weight percent in the concentrated filtrate C. A washed sample of the PPS fines from concentrated filtrate C had a Mw (measured by GPC) of 13,400 g/mol and 74.0 weight percent between 100 and 10,000 g/mol. The GPC distribution (FIG. 5) of the washed PPS fines from filtrate C shows the large amount of low molecular weight material present.

The two invention runs were performed in a manner similar to that described in Run 3, except for the changes noted herein. In invention Run 10, 1.01 g-mol of DCB in 0.5 g-mol of NMP was charged to the dehydrated mixture. Then, 120 g of the concentrated filtrate B with 1.0 g-mol of NMP were charged to the reactor mixture.

In order to calculate the amount of PPS fines contained in the concentrated filtrate, a 40 g portion of the concentrated filtrate was water washed 4–5 times with deionized 80° C. water, filtered and dried in a vacuum oven at 100° C. overnight to yield 1.04 g of PPS fines. Since 120 g of the concentrated filtrate was employed, it was calculated that about 3.1 g of poly(arylene sulfide) polymer was present in the charged filtrate. In Run 11, 120 g of the concentrated filtrate (containing about 3.1 g of PPS fines) were added to the initial charge to the reactor before dehydration.

The results of the two invention runs are shown in Table III along with control Runs 3 and 4 from Example III for comparison. The polymer from Run 10 had a slightly higher Mw than the control runs. However, the polymer from Run 11 was about the same molecular weight as the control runs. Polymers from Runs 10 and 11 had levels of low molecular weight material similar to those of control Runs 3 and 4. These runs show that an unpurified, concentrated filtrate recovered from a PPS polymerization can be added to another PPS preparation in the dehydration step or in the polymerization without significant changes in the polymer.

Example V

Figure 6:
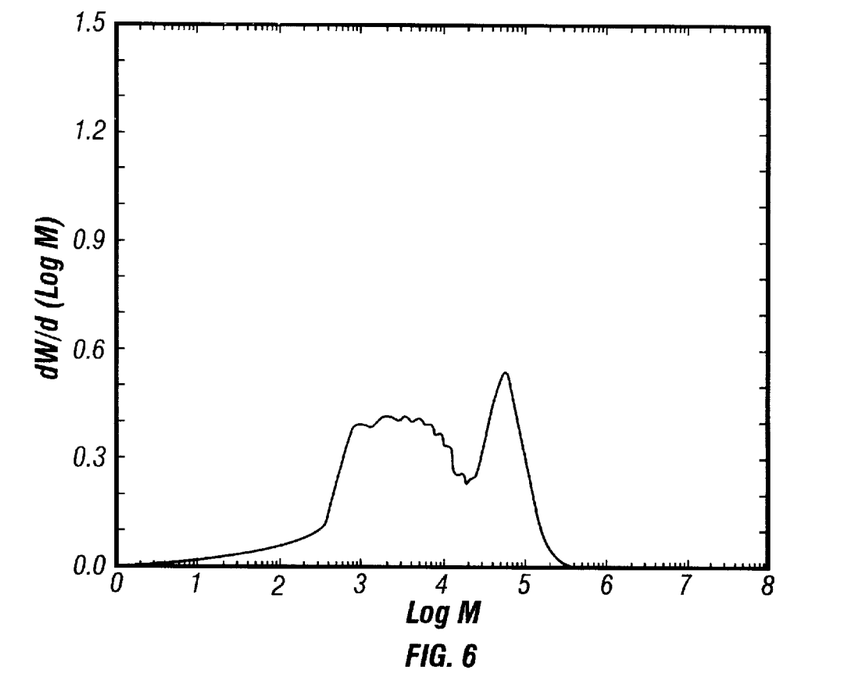

This example describes the use of larger levels of a crude filtrate slurry from a PPS recovery process in another PPS polymerization. The crude filtrate slurry D contained 78.70 weight percent NMP, 4.42 weight percent water, 0.97 weight percent PPS fines, 15.53 weight percent salts, and 0.38 weight percent DCB. A small portion of the slurry D was filtered and washed with hot water to recover the washed PPS fines for analysis. The washed PPS fines had a weight average molecular weight of 25,100 g/mol. As shown in the GPC molecular weight distribution (FIG. 6), 55.7 weight percent of the washed PPS fines from D was in the 100 to 10,000 g/mol range.

Two polymerizations were carried out as described in Run 3 except for the changes noted below. In Run 12, the NaSH and NaOH were charged with 313.4 g of crude filtrate slurry D (containing 2.5 g-mol NMP) for the dehydration step. This slurry contained 3.04 g of PPS fines. After the dehydration step, DCB and NMP were added as in Run 3.

In Run 13, the NaSH and NaOH were charged with 313.4 g of crude filtrate slurry D (containing 2.5 g-mol NMP) for the dehydration step. Following the dehydration step, DCB was charged in the melt and was followed by 125.4 g of the crude filtrate slurry D. The total amount of PPS fines introduced in the two slurry additions was calculated to be 4.3 g.

Table IV shows the results of the two invention runs with the results of Runs 3 and 4 from Example III for comparison. The GPC molecular weight values for the polymers from Runs 3 and 4 were re-run at this time for the most accurate comparison. The yield for Runs 10 and 11 were increased and the extrusion rates were about the same compared with the polymers in Runs 3 and 4.

These results show that the use of the filtrate slurry in the dehydration or in both the dehydration and polymerization steps in place of NMP does produce PPS without significant change in the characteristics of the PPS. The quantities of low molecular weight material in the PPS products are not increased over those in the control polymers by the use of the added fines.

TABLE III

PPS Polymerizations

Concentrated Filtrate B

| Run | Mixture, g | PPS Fines g | Added | Extrusion Rate g/10 min | PPS Product g | Mw, g/mol | Low MW,[a] wt % |
|---|---|---|---|---|---|---|---|
| 3 | None, | Control | | 18.4 | 103.5 | 29,100 | 19.9 |
| 4 | None, | Control | | 10.2 | 100.9 | 32,400 | 16.1 |
| 10 | 120 | 3.1 | After DCB | 8.8 | 104 | 47,200 | 14.2 |
| 11 | 120 | 3.1 | Before dehydration | 18.6 | 103.9 | 32,200 | 16.8 |

[a]Weight % of material having a molecular weight between 100 and 10,000 g/mol.

TABLE IV

PPS Polymerizations

| | | Crude Filtrate D | | | | | |
|---|---|---|---|---|---|---|---|
| Run | Mixture, g | PPS Fines g | Added | Extrusion Rate, g/10 min | PPS Product, g | Mw, g/mol | Low MW,[a] wt % |
| 3 | None, | Control | — | 18.4 | 103.5 | 26,600 | 21.3 |
| 4 | None, | Control | — | 10.2 | 100.9 | 30,400 | 18.4 |
| 12 | 313.4 | 3.04 | Before dehydration | 12 | 106.5 | 37,000 | 15.7 |
| 13 | 313.4 | 4.3 | Before dehydration | 12.6 | 107.6 | 41,900 | 13.7 |
| | 125.4 | | After DCB | | | | |

[a]Weight % of material having a molecular weight between 100 and 10,000 g/mol.

Example VI

The addition of the PPS fines and crude filtrate from one sodium acetate-modified PPS polymerization to another sodium acetate modified PPS polymerization is described in this example.

Run 14 is a control run with no added fines or crude filtrate. A one-liter, titanium autoclave was charged with 1.0 g-mol of aqueous NaSH, 1.02 g-mol NaOH, 0.3 g-mol NaOAc, and 2.5 g-mol of NMP. The autoclave was flushed with nitrogen, closed and heated with stirring. During dehydration, water was removed through a vent line.

Following the dehydration, 1.01 g-mol of DCB in 1.0 g-mol NMP was charged to the autoclave and the mixture was heated to 235° C. and held at that temperature for one hour. The mixture was heated to 265° C. and held for three hours. After the autoclave had been cooled and opened, the product was washed twice with deionized hot (80° C.) water and sieved on a 200 mesh screen (the coarse filter for this example), to produce a granular product retained on the screen and PPS fines in a slurry. The granular product and fines were separately washed with deionized 80° C. water and dried in a vacuum oven at 120° C. overnight. The washed and dried granular PPS product material weighed 93.4 g and the washed and dried PPS fines weighed 9.3 g.

Run 15 was another control run carried out in the same manner as in Run 14 except that the DCB charge was reduced to 1.005 g-mole. Invention run 16 was done in a manner similar to that in Run 14 except that 10.8 g of washed PPS fines B (described in Example III) with 74.34 g of NMP were added after the DCB charge. DCB was charged along with 0.25 g-mol NMP. The fines addition was followed with a rinse consisting of 49.57 g of NMP. About 2.1 g of the fines remained in the charge vessel, so it was calculated that 8.7 g was actually introduced into the polymerization.

Invention Run 17 was carried out in a manner similar to that described for Run 14 except that the DCB was charged with 125.38 g of crude filtrate slurry D (described in Example V) as a source of NMP. Invention Run 18 added 10.8 g of washed PPS fines A (described in Example II) in 80 g of NMP after the charge of DCB in 0.5 g-mol NMP. Approximately 19 g NMP was used as a final rinse. Invention Run 19 was carried out as in Run 18 except for a smaller amount (5.4 g) of washed fines A added with the DCB. Invention Run 20 was similar to Run 17 except that crude filtrate D was used in both the dehydration and polymerization as the source of NMP. 313.4 g of crude filtrate D was added with the NaSH, NaOH, and NaOAc before dehydration and 50 g of crude filtrate D was added with the DCB and followed with a rinse of 75.38 g of crude filtrate D. Apparently the solids level of this polymerization mixture was too high for the reactor since a pressure drop was noted during the 265° C. hold and a solid mass was found high above the agitator upon opening the reactor. The recovered polymer had a relatively high flow rate of 526 g/10 min.

Invention Run 21 was similar to Run 20 except for being run at ½ the scale of Run 20 to improve agitation of the polymerization mixture. The reactor was charged with 0.50 g-mol NaSH, 0.51 g-mol NaOH, 0.15 g-mol NaOAc, and 156.7 g of crude filtrate D before dehydration. 0.505 g-mol of DCB and 62.69 g of crude filtrate D were added after dehydration. The resulting polymer had a flow rate of 262 g/10 min.

The results of these runs are summarized in Table V. All the invention runs had higher total yields than the controls (taking into account that Run 21 was at ½ scale). Runs 17, 18, 19, and 21 had melt flow values similar to those of the control polymers. Run 16 is believed to have been anomalous for some unknown reason, since the polymer had a higher melt flow value than the controls. As previously mentioned, during Run 20, agitation problems occurred.

These runs demonstrate that relatively low molecular weight PPS fines recovered from a polymerization can be introduced in a sodium acetate modified PPS polymerization as recovered fines, in the form of a filtrate, where PPS particles are dispersed in NMP which also contains salts, water and polymerization by-products, and in a concentrated form of the filtrate, and produce desirable polymer.

TABLE V

PPS Polymerizations

| Run | Added Material g | Added Material Type | Added Material Added | Product, g Granular | Product, g PPS Fines | Product, g Total | Flow Rate, g/10 min |
|---|---|---|---|---|---|---|---|
| 14 | None | Control | — | 93.4 | 9.3 | 102.7 | 189 |
| 15 | None, | Control | — | 92.3 | 9.7 | 102.0 | 225 |
| 16[a)] | 8.7 | Washed PPS Fines B | After DCB | 85.4 | 26 | 111.4 | 481 |
| 17 | 125.38 | Crude Filtrate D | With DCB | 96.0 | 8.9 | 104.9 | 182 |
| 18 | 10.8 | Washed PPS Fines A | After DCB | 104.3 | 8.8 | 113.1 | 231 |
| 19 | 5.4 | Washed PPS Fines A | With DCB | 100 | 7.5 | 107.5 | 193 |
| 20[b)] | 439 | Crude Filtrate D | Before Dehydration and With DCB | 76.9 | 28.8 | 105.7 | 526 |
| 21[c)] | 219 | Crude Filtrate D | Before Dehydration and With DCB | 47.6 | 5.8 | 53.4 | 262 |

[a)]Anomalous run.
[b)]Insufficient agitation due to high solids content.
[c)]Similar to Run 20 except at 0.5 mole scale for improved agitation.

Example VII

Figure 7:
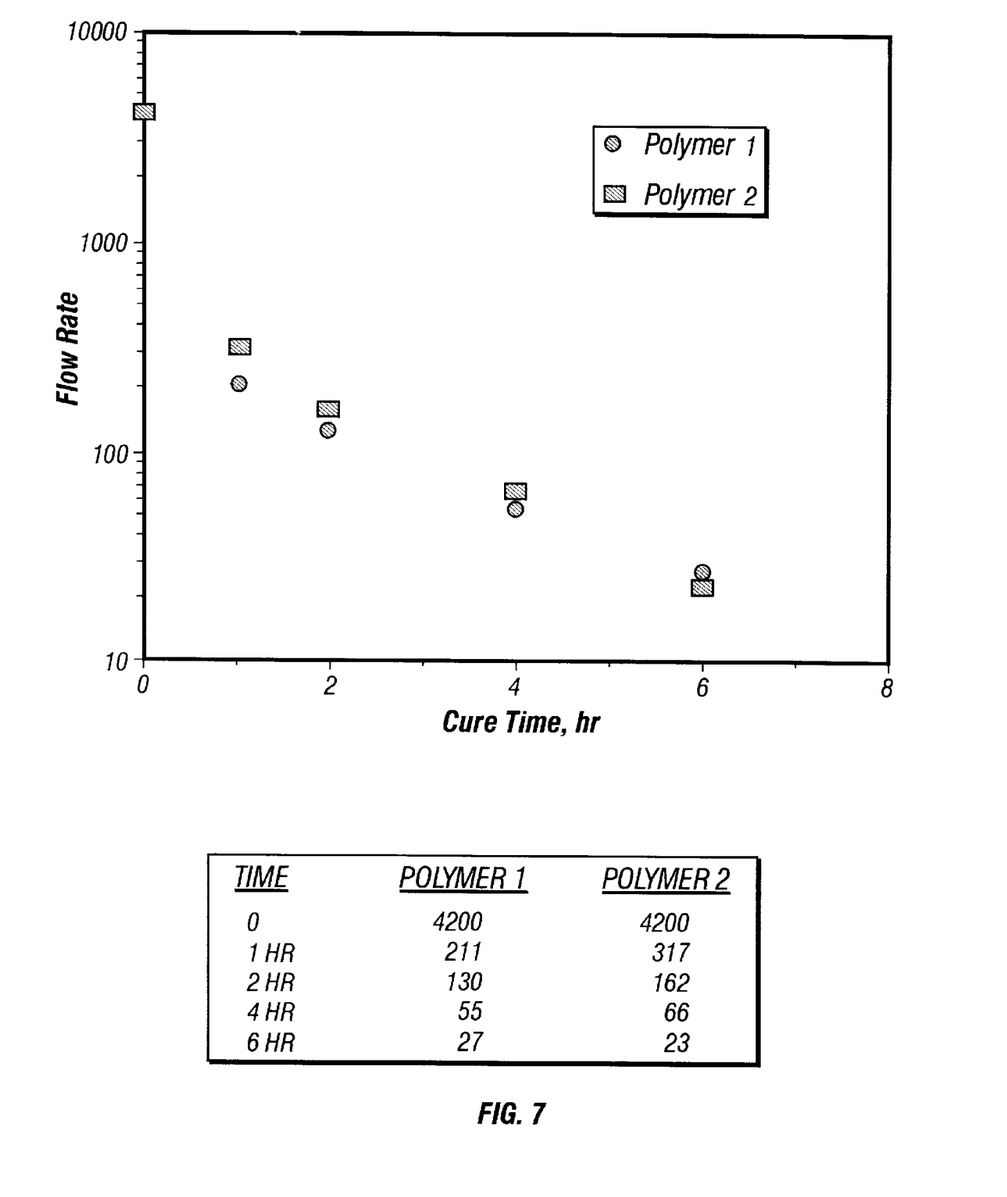
FIG. 7 graphically depicts a comparison of curing behavior of a conventionally prepared poly(arylene sulfide) polymer and a polymer prepared according to this invention.

Since the curing behavior of PPS is very sensitive to changes in the PPS, several of the polymers prepared in the previous examples were cured in air for a comparison. Samples from Runs 1 and 2 in small aluminum pans were cured at 264° C. in a forced air oven for 1, 2, 4, and 6 hours and the melt flow values determined. The results, plotted in FIG. 7, show that the behavior of the inventive polymer is similar to those of the control polymer. This indicates that the addition of the PPS fines to another PPS polymerization does not significantly change the curing behavior of the polymer product.

Example VIII

This example illustrates the use of PPS fines recovered from one PPS polymerization in subsequent polymerizations. Control Run 22 was carried out as described in Run 14. The PPS product of Run 22 had a flow rate of 165 g/10 min. and the washed PPS fines E from Run 22 were found to have a weight of 9.6 g after filtering on a 200 mesh screen, washing with hot water, and drying.

Washed PPS fines E (9.6 g) from Run 22 were added before the dehydration in Run 23. Run 23 was carried out as in Run 22 except for the added PPS fines. The product of the polymerization of Run 23 had a flow rate of 164 g/10 min and the recovered and washed fines F from Run 23 weighed 10.9 g.

Run 24 was carried out as described for Run 23 except that 10.0 g of PPS fines F from Run 23 were added before the dehydration. The polymerization product had a flow rate of 235 g/10 min.

The results of the three polymerizations, which are summarized in Table VI, show that PPS fines can be used in successive polymerizations to produce desirable polymer.

TABLE VI

PPS Polymerizations

| Run | Added Material g | Added Material Type | Added Material Added | Product, g Granular | Product, g PPS Fines | Product, g Total | Flow Rate, g/10 min. |
|---|---|---|---|---|---|---|---|
| 22 | None, | Control | — | 93.1 | 9.6 | 102.7 | 165 |
| 23 | 9.60 | PPS Fines E From Run 22 | Before Dehydration | 101.2 | 10.9 | 112.1 | 164 |
| 24 | 10.0 | PPS Fines F From Run 23 | Before Dehydration | 84.5 | 26.4 | 110.9 | 235 |

That which is claimed:

1. A process for preparing a first essentially linear high molecular weight poly(arylene sulfide) polymer which comprises:
   contacting a polymerization mixture comprising:
   at least one dihaloaromatic compound,
   a sulfur source,
   at least one molecular weight modifying agent,
   and a first polar organic compound,
   with a waste material comprising:
   (a) a second poly(arylene sulfide) polymer;
   (b) cyclic oligomers of the formula n, where $4 \leq n \leq 15$;
   (c) linear oligomers of the formula where $1 \leq p \leq 50$, and X and Y are independently selected from the group consisting of a hydrogen atom, a halogen atom, a phenoxy group, a hydroxy group and the salts thereof, a cyclic amide, substituted and unsubstituted amines of the formula, where $R_1$ and $R_2$ are selected from the group consisting of a hydrogen atom, an alkyl group having from 1 to 10 carbon atoms, a carboxylic acid having from 1 to 10 carbon atoms and a carboxylate having from 1 to 10 carbon atoms;
   (d) and at least one component selected from the group consisting of an alkali metal carboxylate, an alkali metal halide, water, and a second polar organic compound,
   under polymerization conditions to give said first essentially linear high molecular weight poly(arylene sulfide) polymer at an increased yield without increasing low molecular weight polymer.

2. A process according to claim 1 wherein said molecular weight modifying agent is selected from the group consisting of alkali metal carboxylates lithium halides, and water.

3. A process according to claim 2 wherein said molecular weight modifying agent is an alkali metal carboxylate.

4. A process according to claim 3 wherein said alkali metal carboxylate is sodium acetate.

5. A process according to claim 2 wherein said molecular weight modifying agent is water.

6. A process according to claim 1 wherein the molar ratio of the amount of said dihaloaromatic compound to said sulfur source is in the range of about 0.8/1 to about 2/1.

7. A process according to claim 1 wherein the molar ratio of the amount of said first polar organic compound to said sulfur source is in the range of about 1/1 to about 10/1.

8. A process according to claim 1 wherein said second poly(arylene sulfide) polymer has a lower molecular weight than said first poly(arylene sulfide) polymer.

9. A process according to claim 1 wherein said second poly(arylene sulfide) polymer has a molecular weight equal to or greater than that of said first poly(arylene sulfide) polymer.

10. A process according to claim 1 wherein the molar ratio of the total amount of said first and second polar organic compounds to the amount of said sulfur source is in the range of about 1/1 to about 10/1.

11. A process according to claim 1 wherein said waste material further comprises water.

12. A process according to claim 11 wherein said waste material is contacted with said sulfur source and said first polar organic compound under conditions sufficient to remove at least a portion of said water, prior to addition of said dihaloaromatic compound and commencement of said polymerization conditions.

13. A process according to claim 11 wherein said waste material is contacted with said polymerization mixture after commencement of the polymerization at any point in time after about 40 mole percent conversion of the dihaloaromatic compound.

14. A process according to claim 1 wherein said waste material is contacted with said polymerization reaction mixture at any time after commencement of polymerization until termination of said polymerization.

15. A process according to claim 8 wherein said waste material is obtained as that material separated from a desired product in a process to purify a previously prepared poly(arylene sulfide) polymer.

16. A process according to claim 15 wherein said process to purify comprises placing a previously recovered poly(arylene sulfide) polymer in a polar organic compound, optionally in the presence of water, and heating to obtain a liquid mixture of said poly(arylene sulfide) polymer and polar organic compound and optionally water, then cooling and separating the thus refined poly(arylene sulfide) product from said waste material.

17. A process according to claim 8 wherein said waste material is obtained as that material separated from a desired product during the recovery of a poly(arylene sulfide) polymer at the termination of a poly(arylene sulfide) polymerization.

18. A process for preparing an essentially linear high molecular weight poly(arylene sulfide) polymer which comprises:
   contacting a polymerization mixture comprising:
   at least one dihaloaromatic compound,
   a sulfur source,
   at least one molecular weight modifying agent,
   and a first polar organic compound,
   with a waste material from a previous (arylene sulfide) polymerization, said waste material comprising:
   (a) a second poly(arylene sulfide) polymer;

(b) cyclic oligomers of the formula n, where $4 \leq n \leq 15$;

(c) linear oligomers of the formula, where $1 \leq p \leq 50$, and X and Y are independently selected from the group consisting of a hydrogen atom, a halogen atom, a phenoxy group, a hydroxy group and the salts thereof, a cyclic amide, substituted and unsubstituted amines of the formula, where $R_1$ and $R_2$ are selected from the group consisting of a hydrogen atom, an alkyl group having from 1 to 10 carbon atoms, a carboxylic acid having from 1 to 10 carbon atoms and a carboxylate having from 1 to 10 carbon atoms; and (d) and at least one component selected from the group consisting of an alkali metal carboxylate, an alkali metal halide, water, and a second polar organic compound, under polymerization conditions, including a temperature sufficient that said essentially linear high molecular weight poly(arylene sulfide) polymer is in molten phase; and introducing a sufficient amount of a separation agent that is soluble in said polar organic compound and is not a solvent for poly(arylene sulfide) to cause phase separation between molten poly(arylene sulfide) polymer and polar organic compound and reducing the temperature of said polymerization mixture sufficiently to produce a slurry comprising said essentially linear high molecular weight poly(arylene sulfide) in particulate form in polar organic compound.

19. A process according to claim 18 wherein said first polar organic compound is N-methyl-pyrrolidone and wherein said separating agent is water.

20. A process according to claim 19 wherein said essentially linear high molecular weight poly(arylene sulfide) polymer is produced in increased yield, as a result of the presence of said waste material, without increasing low molecular weight polymer.

* * * * *